3,312,612
KETOXIME PRODUCTION
Chai Y. Choo, Paramus, N.J., assignor to Halcon International, Inc., a corporation of Delaware
No Drawing. Filed Jan. 24, 1963, Ser. No. 253,757
8 Claims. (Cl. 204—162)

This invention relates an an improved process for the production of ketoximes from cyclic paraffins and more particularly to the production of such ketoximes by the reaction of such paraffins with nitrosating agents such as nitrosyl chloride and hydrogen chloride, or hydrogen chloride and nitrogen dioxide and nitric oxide, or the like, in the presence of active light and an intensity of agitation equal to at least 0.1 H.P. per 1000 gal. of liquid.

It is known that ketoximes can be recovered from the photochemical reaction products of nitrosyl chloride with cycloaliphatic hydrocarbons. However, in usual operation filming occurs on the reactor walls and interferes with light transmission. This results in troublesome maintenance problems and also lowers efficiency. The art is confronted by the problem of providing more economical and efficient processes for producing such oximes or their hydrochlorides.

The discoveries associated with the invention and relating to the solution of the above problems, and the objects achieved in accordance with the invention as set forth herein include the provision of:

a process for the production of ketoxime materials wherein a normally liquid cyclic paraffinic compound is reacted with nitrosating agent in the presence of active light including the improvement which comprises agitating the reaction mixture at a degree of agitation equal to at least 0.1 H.P. per 1000 gallons of liquid; preferably above 1.0 or such that the mixture is in a turbulent state, whereby objectionable filming is avoided in 10 hours operation;

such a process wherein the light used is first passed through a filter to exclude light of below 2800 Angstroms wave length and the degree of agitation is about 3.3 H.P. per 1000 gallons of liquid or equal to a pumping rate of 100 gallons per minute per square ft. of flow cross-section area;

such a process wherein the nitrosating agent is nitrosyl chloride and hydrogen chloride;

such a process wherein the paraffinic compound is cyclohexane and cyclohexanone oxime is produced;

such a process wherein the paraffinic compound is cyclooctane, and cyclooctanone oxime is produced;

such a process wherein the paraffinic compound is a halocyclohexane, and a halocyclohexanone oxime is produced;

such a process wherein the paraffinic compound is selected from those having 5 to 20 carbon atoms in the ring; and other objects which will be apparent as details or embodiments of the invention are set forth hereinafter.

In order to indicate still more fully the nature of the present invention, the following examples of typical procedures are set forth in which parts and percents mean parts and percents by weights, respectively, unless otherwise indicate, it being understood that these examples are presented as illustrative only and they are not intended to limit the scope of the invention.

EXAMPLE 1

A one kw. arc lamp assembly of about 5 in. dia. and 14 in. in length is inserted in a suitable vertical annular reaction vessel which is provided at the top with a feed line and at the bottom with an outlet leading to a receiver, said lamp assembly including a cooling section of silica glass which is provided with an inlet and outlet. The lamp is surrounded by a cooling well containing water. The reaction chamber is annular, about 6 in. inner diameter and about 16 in. outer diameter, and about 16 in. high. It is provided with two vertical equi-spaced marine propeller agitators which drive the liquid downward. Each propeller is set about 10 in. from the bottom of the reactor. Each propeller is about 2.75 in. in diameter.

Liquid cyclohexane is fed to the reactor, maintained by external cooling at about 7° C. A mixture of NOCl and HCl gases in a molar ratio of 1 to 4 is bubbled through the cyclohexane while the lamp irradiates the contents of the reactor. The cyclohexane reacts to form an oily layer that settles to the bottom of the reactor.

This oily layer is principally cyclohexanone oxime hydrochlorides and HCl with some cyclohexane. The oil is drawn off and mixed with 98% sulfuric acid. Upon warming to 55° C., HCl is driven off and is recycled to the reactor, after mixing with fresh NoCl. Upon heating the oil further to 105° C. it rearranges to a crude caprolactam dissolved in sulfuric acid.

Anhydrous ammonia is added to neutralize the sulfuric acid and the resulting ammonium sulfate is centrifuged away from the caprolactam. The crude caprolactam is then purified by one of many known techniques.

Under the conditions used, the yield is about 96 to 98 mols of cyclohexanone oxime (hydrochlorides) per 100 mols of cyclohexane consumed.

Using a degree of agitation equal to 3.3 H.P. per 1000 gallons of liquid which is equal to a pumping rate of 100 gallons per minute per square foot of flow cross-sectional area (Reynolds number of about 11,000), there is substantially no film deposit at the light well even after 100 hours of continuous operation.

As to using H.P. units to measure agitation, reference is made to Rushton et al., Chemical Eng. Progress, vol. 46, pp. 395–404, and 467–476 (1950); to Brown, "Unit Operations" (1950), John Wiley and Son, Inc., New York, N.Y., and to Drew, "Advances in Chemical Eng.," vol. 3, pp. 194–5, Academic Press Inc., New York, N.Y.

*Comparative examples*

Following the above procedure and the same conditions, except using no agitation, over 60% of the light well surface is coated with film in less than 6 hours of operation, and there is a sharp drop in yield of oxime. Similar results are obtained with usual agitation (much lower than that of Example 1).

These data clearly show the surprising results obtained in accordance with the invention in 10 hours or more of operation.

High conversions and high yields relative to power consumption are achieved in accordance with the invention. There is substantially no filming, even when the reaction mixture is re-circulated in the reactor to a conversion level of over 40%.

The agitation can be provided in any convenient way, e.g., by gas, mechanically, or the like. The light rays from the lamp in the center of the reactor pass through silica glass and water coolant prior to contacting the reaction mixture.

Continuous type photochemical reactors are known, and suitable reactors are described in Chemical Engineering, February 1955, pp. 174 and 175. Any convenient shape and size of reactor and suitably high intensity light source may be used, along with suitable agitation means that provide agitation equal to at least 0.1 and desirably above 1.0 H.P. per 1000 gallons of liquid or a pumping rate equal to 30 or more gallons per minute per sq. ft. of flow area. There is no operative upper limit except economics and avoiding bubbling or cavitation in the liquid. However, about 20 H.P. is a practical upper limit. Preferably, the mixture is in a turbulent state.

Liquid or solid filters, or both types may be used, e.g., glass (Pyrex, Corex, and the like) or inorganic (aqueous salt solution) or organic liquid filters and the like. The exclusion of wave lengths below about 2,800 Angstroms (and the use of wave lengths from about 2,800 Angstroms through the visible spectrum) helps in elimination of filming; i.e., formation of oily film around the light well which results in decreased selectivities and yields and a radical decrease in light efficiency.

At low temperatures, e.g., 0° C., it may be necessary to add diluents which are inert to the reactants (to avoid freezing of the cyclic paraffinic compounds) as, for example, carbon tetrachloride or benzene. The addition of diluents may also be advantageous, however, at room temperature in order to facilitate the separation or removal of the oxime hydrochlorides.

The oil is added directly to concentrated sulfuric acid and subjected to a Beckman rearrangement to give the corresponding lactam.

The free oxime may be recovered in known manner from the separated oxime hydrochlorides. For this purpose, the oxime hydrochloride may be dissolved in a little water, and neutralized with an alkaline material such as caustic soda or potash solution, alkali carbonates or ammonia. The free oximes precipitate readily.

The cyclic paraffinic compounds may have 5 to 20 carbon atoms in the ring. Comparable results to those of Example 1 are achieved with cycloaliphatic hydrocarbons, such as cyclopentable, cyclohexane, cycloheptane, cyclooctane, cycloeicosane, and the like, and their halo, oxy, oxo, alkoxy, acyloxy; and the like derivatives. Suitable light sources are xenon or mercury or other metal vapor lamps. Preferred lamps are those having relatively long lifetime, high output of useful light per unit length of arc or lamp, and relatively low output of light of wave length below 2800 Angstroms.

The non-filming operation achieved in accordance with the invention is indeed surprising, especially since it avoids the use of additives as suggested heretofor.

In view of the foregoing disclosures, variations and modifications thereof will be apparent to one skilled in the art, and it is intended to include with the invention all such variations and modifications except as do not come within the scope of the appended claims.

What is claimed is:

1. In a proces for the production of ketoxime materials wherein a normally liquid cyclic paraffinic compound is reacted with a nitrosating agent in the presence of active light, the improvement which comprises agitating the reaction mixture at a degree of agitation equal to at least 0.1 H.P. per 1000 gallons of liquid and such that objectionable filming is avoided in 10 hours' operation.

2. A process of claim 1 wherein the mixture is in a turbulent state.

3. A proces of claim 1 wherein the light used is first passed through a filter to exclude light of below 2800 Angstroms wave length and the degree of agitation is equal to a pumping rate of about 30 gallons per minute per square foot of cross-sectional area.

4. A process of claim 3 wherein the nitrosating agent is nitrosyl chloride and hydrogen chloride.

5. A process of claim 4 wherein the paraffinic compound is cyclohexane and cyclohexanone oxime is produced.

6. A process of claim 4 wherein the paraffinic compound is cyclooctane, and cyclooctanone oxime is produced.

7. A process of claim 4 wherein the paraffinic compounds is a holocyclohexane, and a halocyclohexanone oxime is produced.

8. A process of claim 4 wherein the paraffinic compound is selected from those having 5 to 20 carbon atoms in the ring.

References Cited by the Examiner

UNITED STATES PATENTS

| | | | |
|---|---|---|---|
| 2,985,572 | 5/1961 | Von Schickh et al. | 204—162 |
| 3,047,482 | 7/1962 | Cheng et al. | 204—162 |
| 3,048,634 | 8/1962 | Mueller et al. | 204—162 |

JOHN H. MACK, *Primary Examiner.*

JOHN R. SPECK, *Examiner.*

H. S. WILLIAMS, *Assistant Examiner.*